United States Patent [19]

Achterholt

[11] Patent Number: 5,774,048
[45] Date of Patent: Jun. 30, 1998

[54] VALVE HAVING MEANS FOR GENERATING A WIRELESS TRANSMITTABLE INDICATING SIGNAL IN CASE OF A PRESSURE DROP WITHIN VEHICLE TIRES

[75] Inventor: Rainer Achterholt, Durach/Weidach, Germany

[73] Assignee: Alpha-Beta Electronics AG, Ellighausen, Switzerland

[21] Appl. No.: 307,776

[22] PCT Filed: Feb. 7, 1994

[86] PCT No.: PCT/EP94/00341

§ 371 Date: Dec. 19, 1994

§ 102(e) Date: Dec. 19, 1994

[87] PCT Pub. No.: WO94/18018

PCT Pub. Date: Aug. 18, 1994

[30] Foreign Application Priority Data

Feb. 8, 1993 [DE] Germany .......................... 43 03 583.3

[51] Int. Cl.$^6$ .................................................. B60C 23/00
[52] U.S. Cl. .......................... 340/447; 340/442; 340/445; 73/146.2; 73/146.3; 73/146.4; 73/146.8
[58] Field of Search ..................................... 340/442, 443, 340/445, 447; 73/146.1, 146.3, 146.4, 146.5, 146.8; 116/34 R

[56] References Cited

U.S. PATENT DOCUMENTS

| | | |
|---|---|---|
| 3,593,268 | 7/1971 | Arvan ..................................... 340/442 |
| 4,209,765 | 6/1980 | Mitchell ................................. 340/445 |
| 4,570,152 | 2/1986 | Melton et al. .......................... 340/449 |
| 4,742,857 | 5/1988 | Gandhi ................................... 340/445 |
| 4,788,525 | 11/1988 | Lichtenstein ............................ 340/442 |
| 4,953,394 | 9/1990 | Franke et al. ........................... 340/445 |
| 5,040,561 | 8/1991 | Achterholt .............................. 340/447 |
| 5,231,872 | 8/1993 | Bowler et al. .......................... 340/445 |
| 5,285,189 | 2/1994 | Nowicki et al. ........................ 340/442 |
| 5,289,160 | 2/1994 | Fiorletta ................................. 340/445 |
| 5,302,939 | 4/1994 | Downs et al. .......................... 340/445 |

*Primary Examiner*—Jeffery Hofsass
*Assistant Examiner*—Ashok Mannaua
*Attorney, Agent, or Firm*—Pollock, Vande Sande & Priddy

[57] ABSTRACT

A valve which includes signal generating means generate a signal representing a pressure drop within a vehicle tire. The valve includes an absolute pressure sensor coupled to measure the pressure within the tire. A microprocessor is provided which upon activation following operation of the valve stores a value of the electric pressure signal from the pressure sensor in a memory. During operation of the vehicle, the stored reference electric pressure signal is compared with periodic measurements of pressure within the tire. The transmitter is activated at periodic intervals, whenever a given ratio between the compared values and a threshold value exceeds an upper or lower limit. The system is activated by a acceleration sensor which can detect when the vehicle is moving, thus avoiding power consumption stopped.

15 Claims, 1 Drawing Sheet

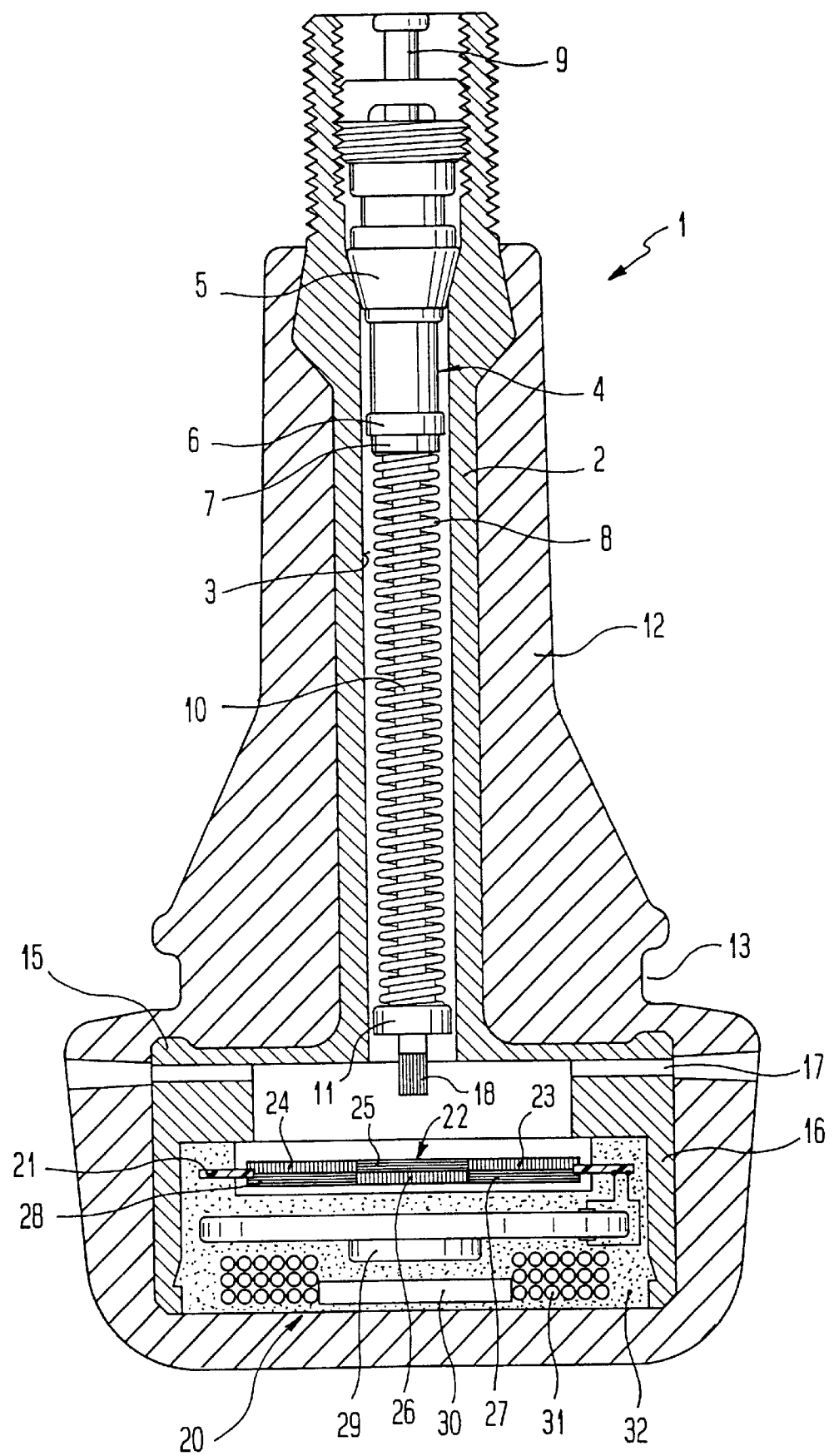

VALVE HAVING MEANS FOR GENERATING A WIRELESS TRANSMITTABLE INDICATING SIGNAL IN CASE OF A PRESSURE DROP WITHIN VEHICLE TIRES

BACKGROUND OF THE INVENTION

The present invention is related to a valve having means for generating a wireless transmittable indicating signal in case of a pressure drop within vehicle tires. This valve is especially suited for tires of passenger cars, lorries, trucks and aircrafts.

In more detail, the invention is related to a valve having means for generating a wireless transmittable indicating signal due to a pressure drop (signal generating means) within vehicle tires, wherein the tire valve comprises a valve spud and a valve stem extending from said valve spud. The signal generating means is mounted on said valve spud at a valve spud side remote from said valve stem. Further, said signal generating means comprises a pressure sensing means, a transmitter means and a power supply means. A valve of said kind is known from U.S. Pat. No. 5,040,561. The pressure sensing means disclosed therewith comprises a reference pressure chamber being admittable with a desired tire pressure when the tire valve means is opened, and being closed pressure-tight when the tire valve means is closed. Said reference pressure chamber is partly defined by a deflectable diaphragm being provided with a movable switching member of a pneumatic-mechanic pressure switch. Whenever the switching contact is completed, the transmitter means will be activated and will emit an indicating signal indicating a pressure drop.

Typically the sensitivity of a pneumatic-mechanic pressure switch of said kind is not very high, because a deflection of the diaphragm requires significant pressure differences; typically a sensitivity lower than 0.3 or 0.4 bar may be not obtained. Whenever the diaphragm is made of a thin plastics or gum material, then there is a danger of a gradual gas diffusion through the diaphragm, which may cause a variation of the desired pressure adjusted within the reference pressure chamber. Further, there is a danger that the diaphragm may be displaced by substantial acceleration forces provided by the rotating wheel.

Recently miniaturized absolute-pressure sensors have been developed being formed like a semiconductor component and comprising a piezoresistive transducer or a transducer system having a capacitive bridge circuit. Absolute-pressure sensors of said kind generate an electric output (signal) which may be used for a modulation of a carrier frequency following an amplification and processing of said output signal. Absolute-pressure sensors of said kind may be held in an active status continuously or periodically or may be activated only in case of an inquiry signal or instruction. Frequently the reproducibility or consistency of an absolute tire pressure measuring by means of said absolute-pressure sensors provides problems, especially when considering the hard operating conditions of vehicle wheels, because said absolute-pressure sensors require a stabilized input voltage, a careful calibration of the off-set voltage and relatively constant operating conditions. Further, the telemetric transmission of a sensed absolute-pressure value requires some electronic expenditure.

Starting therefrom, it is a technical problem (object) of the present invention to provide a tire valve of the stated kind having a signal generating means including a pressure sensing means which senses the pressure within the vehicle tire by a miniaturized absolute-pressure sensor generating an electric output where the known problems regarding the reproducibility and the electronic expenditure have been reduced essentially. Especially, a tire valve of said kind is to be provided having a signal generating means being structured simple and robust, being adapted to sense the pressure within the tire at an accuracy of at least 0.1 bar and providing during a several years service time only a minimum power demand which may be provided easily by a conventional button cell.

SUMMARY OF THE INVENTION

Starting from a valve having means for generating a wireless transmittable indicating signal due to a pressure drop (signal generating means) within vehicle tires, and comprising a valve spud and a valve stem, wherein the signal generating means being mounted at the valve spud side remote to said valve stem, and further comprising a pressure sensing means, a transmitter means and a power supply means, the solution of the technical problem according to the present invention is characterized by a signal generating means which comprises a) an absolute-pressure sensor being admittable with the pressure within the tire and generating an electric output which corresponds to the pressure within the tire;

b) an electronic storage means adapted to store continuously a selected electric pressure signal or an electric signal derived from said selected electric pressure signal;

c) a microprocessor comprising an arithmetic-logic unit, which
   compares a newly generated electric pressure signal with the selected and stored pressure signal, and which generates a compare signal;
   refers the compare signal to a given threshold value; and which activates the transmitter means whenever a given ratio between the threshold value and the compare signal is above or below upper or lower limits; and d) an activating means the activation thereof causes the generation and storing of the selected electric pressure signal.

According to the present invention the pressure within the tire is sensed by means of a miniaturized absolute-pressure sensor. Said miniaturized absolute-pressure sensor comprises a modified semiconductor component, preferably based on silicon, and having additionally transducer structures formed micro-mechanically. An exemplary embodiment of a solid-state (monolithic) absolute-pressure sensor comprises a hermetically sealed vacuum chamber serving as reference and being partly defined by a deflectable diaphragm or bridge equipped with a transducer system. Said transducer system may form a piezoresistive transducer having resistor elements being connected like a Wheatstone's bridge. Alternatively, said transducer system may form a component of a capacitive bridge circuit comprising, for example, four capacitors. The micro-mechanically formed transducer structure may be connected in a monolithic manner with additional circuit elements providing, for example, functions such as stabilizing an input voltage and generating a reference voltage, compensating effects influenced by varying temperatures, and setting a zero point, a zero offset, a sensitivity and a measuring range control. The absolute-pressure sensor may be formed along with other components (such as a microprocessor, a temperature sensor, an accelerating sensor and further circuit elements)

on a chip being fastened on a substrate made of glass or ceramics. Solid-state (monolithic) absolute-pressure sensors of said kind and comprising a piezoresistive transducer structure are commercially available for pressure measurements, for example, in pressure ranges of from 0 to 3.5 bar gauge or of from 0. to 7.0 bar gauge or of from 0 to 14 bar gauge, and are useful in a temperature range of from minus 40° C. to plus 125° C. Within a pressure range extending of from about 1 to 7 bar gauge and being of especial importance for the present invention, an accuracy of at least 0.1 bar may be obtained. Typically the output (signal) is a voltage in a magnitude of several volt. The operating power input may amount, for example, about 1 milli Ampere. Transducer systems comprising a capacitive bridge circuit may provide an especially high sensitivity (in a magnitude of 10 milli bar), a high linearity and a low temperature dependence.

According to an essential aspect of the present invention, an absolute-pressure sensor of the fore-mentioned kind is allocated to or coordinated with an electronic storage means adapted to store continuously a selected electric pressure signal which has been generated by said absolute-pressure sensor. Typically said sensor generates an output signal in the form of a voltage. Said voltage represents an analog signal and is preferably fed to an analog to digital converter in order to obtain a digitized pressure signal. The digitized pressure signal which may represent the sensed pressure value, for example, in the form of a 8-bit word or in the form of a 16-bit word, is stored continuously within the electronic storage means. Obviously, the electronic storage means requires a relatively small storage capacity, because only one bit word or a small number of bit words has to be stored. Of importance is that the electronic storage means may store the fed bit words continuously and reliably, requiring only a minimum power demand. For example, as an electronic storage means requiring a minimum power demand, a RAM having a continuous power demand less than 1 micro Ampere or an EEPROM may be used.

A RAM (random excess memory) stores the digitized data as long as an operating voltage is applied and as long as no new information is being applied. For example, RAM devices are commercially available requiring with an operating voltage of about 1.5 Volt only a continuous power demand of fractions of 1 micro Ampere. In case where a RAM of said type is buffered, for example by a battery providing a capacity of about 10 milli Ampere per hour, a usable service life of several years may be obtained.

An EEPROM (electrically erasable programmable read only memory) stores the impressed data even following a switching-off of the operating voltage. Typically, the necessary voltage being applied to the input "PROGRAMMING" and thereafter the several informations (status, this means high or low voltage) will be impressed into and continuously hold within the storage means at those places which are pointed to by the address. In order to read-out, an address is applied and a read-out input is activated. New information or data may be impressed and stored by electric over-writing or a new application. In addition to said typical mode of operating an EEPROM there are modified systems for applying and/or reading-out data from an EEPROM. The specific feature of storage means of said type is that the stored data will be maintained even following a switching-off of the operating voltage. EEPROMs and modified systems thereof are commercially available.

By combining an absolute-pressure sensor with an electronic storage means for an electric pressure signal (provided by said sensor) the present invention provides an "electronic equivalent to the reference-pressure chamber" of the conventional reference-pressure chamber provided with known systems for sensing and indicating a pressure drop within tire vehicles. Said "electronic equivalent" according to the present invention provides several advantages and benefits.

For example, a higher accuracy is obtained when sensing, storing and reproducing the value of a desired pressure within the vehicle tire; the accuracy of the value of the desired tire pressure amounts at least 0.1 bar. Said "electronic equivalent" does not comprise any variable components which might be influenced by the acceleration forces of a rotating vehicle wheel.

Further, a value of a desired pressure within the tire being present in digitized form such as a bit word may be stored practically for an indefinite duration without any danger of becoming varied or falsified. The stored pressure value is available in a simple and fast manner for any kind of further processing within a microprocessor, especially for comparing with a new pressure value representing the actual pressure within a vehicle tire. When making such a comparison, a compare signal is generated. Further, a reference is made between said compare signal and a given threshold value. The transmitter means will be activated, and a signal indicating a pressure drop will be emitted whenever a given ratio between the threshold value and the compare signal will be over or under a specified deviation. By means of said ratio and/or by means of said threshold value, the sensitivity and along therewith the release of an alarm signal and/or the kind of an alarm signal may be varied.

Contrary to the conventional use of an absolute-pressure sensor and in accordance with an aspect of the present invention, it is not necessary to reproduce and indicate the sensed pressure value in the form of an absolute pressure value or digit. Alternatively and in accordance with a preferred embodiment of the present invention, the preferred digitized pressure value is stored in the form of a reference value, which is available for comparison purposes. The absolute digit or magnitude of said stored value is of minor importance provided that the newly generated pressure value which is used for said comparison will be generated and will be hold available under the same overall conditions as the selected pressure value representing a given pressure within the tire. This means, according to the present invention, the relatively laborious measurements for gauging and calibration are not longer necessary which, on the other hand, are necessary requirements for the accurate and consistent reproduction of absolute pressure values. Within the purposes of the present invention it will be sufficient when the subsequently generated pressure signal, which corresponds to the actual pressure within the tire at a later date, will be obtained within the same specific overall conditions as used for the earlier generating of the selected pressure signal which represents a given or desired pressure within the tire. The specific deviations of both measurements will be compensated and may not impair the results of a comparison of the both pressure signals.

Further, said "electronic equivalent to a conventional reference pressure chamber" in accordance with the present invention may be realized using small and simple designed solid-state components and elements being available commercially and at low cost. Typically, the absolute-pressure sensor, the analog to digital converter, the electronic storage means and the microprocessor may be integrated all together on one single chip fastened to a board. Using said "electronic equivalent to a conventional reference pressure chamber", much more simple, robust, compact and reliable devices for a control of the pressure within a vehicle tire may be realized than with a conventional reference pressure chamber.

DESCRIPTION OF THE FIGURE

The FIGURE illustrates a sectional view of a preferred embodiment of the invention.

DESCRIPTION OF THE PREFERRED EMBODIMENT

The absolute-pressure sensor generates inter alia a selected electric pressure signal which is stored within the electronic storage means and which is available like a reference pressure by electronic signal processing. The selected pressure signal has to be generated at that time when an intended desired pressure is present within the vehicle tire.

A typical valve for vehicle tires comprises a valve means including a movable valve body biased by a spring against a valve seat in order to close pressure-tight the valve means and along therewith the vehicle tire. Further, the valve body may be removed from the valve seat against the spring biasing by means of a valve push rod in order to effect a tire inflation step or in order to control or change the pressure within the tire. Typically, immediately following a tire inflation step and/or tire pressure control step, an intended, desired tire pressure is prevailing within vehicle tire which corresponds to the pressure reading at the pressure gauge or at another pressure control instrument provided at the service station.

The valve according to the present invention composes an activating means which activates the signal generating means following every tire inflation step and/or tire pressure control step in order to sense the tire pressure prevailing immediately at said moment and to store said sensed pressure as selected electric-pressure signal within the electronic storage means. A preferred embodiment of said activating means comprises a permanent magnet being mechanically coupled to the valve push rod and following the movement of said valve push rod when opening or closing the valve means. A magnetic field sensor is allocated to said permanent magnet. A suited magnetic field sensor may be selected, for example, from a group including Reed contacts, Hall sensors or magnetically controlled transistors. Preferred according to the present invention is a magnetically controlled transistor having a small, robust and mechanically reliable structure. When pushing down the valve body in order to open the valve means, a distance of the permanent magnet to the magnetic field sensor will be varied and the magnetic field sensor will trigger an activating signal. By means of a suited circuit including a time-lag device or electronic delay element, it is possible to sense the tire pressure a short, given period later than completing the steps of opening and closing the valve means. Herewith it is guaranteed that actually that desired tire pressure will be sensed which is prevailing within the tire following a compensation and/or equilibration of the pressure within the tire and the valve, and not disturbed by any flow phenomena and the like within the valve. The thus generated electric pressure signal which corresponds to a given and desired pressure within the tire serves as "selected pressure signal" and will be stored within the electronic storage means.

Essentially, said selected pressure signal serves as reference signal when performing a comparison with the later on generated new pressure signals which correspond to the actual pressure within the tire at said time. According to a further aspect of the present invention, the electronic storage means and/or the microprocessor may additionally contain a given pressure value adapted to the present system which corresponds to the typical inflation or service pressure of a given vehicle tire; with conventional tires for passenger cars said given pressure value may comprise, for example, a value in the range of from about 1.0 to about 2.5 bar gauge. Thereto, the selected pressure signal will be compared with the a priori given pressure value, in order to sense heavy mistakes during a tire inflation step, for example when the tire inflation step will lead to a significantly low cold-filling pressure and/or will remain under another lower limit. In those cases, the microprocessor may trigger the transmitter means to emit a corresponding signal which will cause at the instrument panel an alarm signal indicating a false tire inflation pressure.

Typically, the absolute-pressure sensor will initially generate the electric pressure signal in a form like an analog signal. Preferably, said analog signal will be digitized in order to obtain a digital signal, for example, a 8-bit word or a 16-bit word, which will be stored and used for the signal comparison step. The necessary analog to digital converters are conventional devices and are available commercially at low cost; additionally said analog to digital converters may be integrated as additional an electronic device on the chip.

In those cases the electronic storage means is preferable a digital storage means. Digital storage means of said kind have a relatively simple design and are commercially available.

According to another preferred aspect of the present invention, the signal generating means may comprise additionally a solid-state acceleration sensor. Basically, an acceleration sensor of said kind comprises a similar structure like the fore-mentioned and explained absolute-pressure sensor. A typical acceleration sensor comprises a diaphragm which is mechanically stressed by varying acceleration forces. The diaphragm forms components of or is connected with resistor elements and/or capacitor means, the electric characteristics thereof will be modified in accordance with the varying acceleration forces. The acceleration sensor generates an electric output signal, which corresponds to the actual acceleration force. A road or pavement may transfer to the wheel of a running passenger car shocks, pulses and other impacts, which will induce in the tire acceleration forces in a vertical direction in a range until about 25 g. Further, a vehicle speed of 250 km per hour may induce at the vehicle wheel centrifugal acceleration forces in a range until about 830 g. A suited acceleration sensor has to withstand those acceleration forces. Further, a suited acceleration has to sense accurate acceleration sensor forces in a range of from about 0 to about 10 g, in order to discriminate between a vehicle standing still and the same vehicle running in a walking speed (go slow mode). The acceleration sensor may be realized along with other devices (such as an absolute-pressure sensor, a storage means, an analog to digital converter, a microprocessor and the like) on a common chip.

By means of an acceleration sensor it will be possible to correct and/or compensate measuring errors of the absolute-pressure sensor, which may be caused by varying acceleration forces. However, it is even more important to sense by means of an acceleration sensor whether a vehicle is standing still or is running at least in a walking speed. Acceleration forces of about 3 g will be induced in a wheel of vehicle which is running in walking speed. By means of an acceleration sensor, a standing-still status of a vehicle may be sensed, and the power demand and power consumption of the system may be reduced during said standing-still status. Preferably, a periodical sensing of the pressure within a vehicle tire is only initiated or activated whenever the vehicle is running at least with walking speed (about 5 km per hour). Further, by means of an acceleration sensor a discrimination may be made between a slow speed ride (for example riding in a city, stop-and-go ride) and a high speed ride (for example riding on a highway) of a vehicle. Adapted to the mode of vehicle riding, an activation of the absolute-pressure sensor and/or of the microprosessor may be effected in longer or shorter intervals or periods of time.

Alternatively, it is possible to make use of a second absolute-pressure sensor instead of using an acceleration sensor. Said second absolute-pressure sensor may sense the small, periodic pressure impacts within a tire, which will typically be generated by a rotating vehicle wheel. Said second absolute-pressure sensor may be used to discriminate between a standing-still vehicle and a running vehicle in order to activate the microprocessor and the related sensors only in case of a running vehicle.

According to another preferred aspect of the present invention, the signal generating means comprises additionally a solid-state temperature sensor. Preferably, said temperature sensor may comprise a measuring range extending from about minus 40° C. to about plus 150° C. Said temperature sensor may sense the temperature of the pressurized fluid within the tire of the vehicle. The thus obtained values of the temperature of the tire material and/or of the pressurized fluid within the tire may be used to compensate temperature dependent deviations from the standard conditions of the sensed tire pressure. Further, an alarm may be triggered when exceeding a threshold temperature; this feature is especially important for the tires of lorries and trucks.

According to another preferred aspect of the present invention, the signal generating means comprises a clock generator providing a clock frequency for a periodical activation of the measuring system. The power consumption of the clock generator is less than 30 nano Ampere. It is possible by means of said clock generator to activate the microprocessor and the relevant sensor in certain intervals. The microprocessor may take a non-operative status or mode where the microprocessor is completely shut-off from the power supply means and does not consume any electrical power.

For example, the clock generator may provide clock frequencies which will connect the microprocessor with the operating voltage in intervals of 4 seconds. This will initiate the system, and the several sensors sense the corresponding functions, for example, the tire pressure, the acceleration and the temperature. The formed electric signals are fed to the microprocessor, and will be processed and compared with the stored signals or data. In case where a given ratio between the threshold value and the compare signal is below or above a required amount, a log or listing will be emitted. Said log or listing may provide different alarm signals, for example an indication of a too low cold-filling pressure of the tire, a "rapid warning" whenever a given leakage rate is exceeded, or a "soft warning", whenever a minor leakage rate in a range of about 0.1 bar per month is occuring. These different alarm signals may comprise different signal frequencies, generated by the microprocessor and emitted by the transmitting antenna of the transmitter means. For example, good results have been obtained with a radiation efficiency of about 6 milli Watt.

A routine interrogation of the measuring values and the processing thereof with the result, that emitting of a log or listing is not required, will take only a few milli seconds. In case where the system will additionally emit a log or listing, the system has to be activated for a few 10 milli seconds. Thereafter, the microprocessor will be reset by an automatic control in a stand-by condition, and the system is waiting for a renewed activation or initialization.

In a general routine, this initialization will be effected, for example, in intervals of 4 seconds. However, it is possible by means of the acceleration sensor to start said initialization only in case of vehicle running at least with a walking speed. Whenever the vehicle remains in a standing-still status, the periodic interrogation of the sensors may be omitted completely or may be performed in much larger intervals of time. Further, it is possible by means of the acceleration sensor to perform an initialization with a slowly riding vehicle in larger intervals (for example in intervals of 30 to 60 seconds) and with a fast riding vehicle in shorter intervals (for example in intervals of 2 to 3 seconds).

A very power saving operating method may be realized by said adoption of the measuring program to the mode of vehicle riding and/or by initiating the periodic interrogation of the sensors and processing the measuring values only in certain intervals of time. Said power saving operating method of the complete system increases essentially the useful service life of a power supply means. For example, a suited power supply means is a lithium battery providing a capacity of at least 40 milli Ampere hours, and a voltage of about 3 Volt. For example, a lithium battery of said type may be formed like a button cell.

According to a further aspect of the present invention, a voltage control of the power supply means may be provided. For example, the capacity of the battery may be controlled in given intervals, and an alarm signal may be generated whenever the battery capacity has dropped. Thereto, it is possible to generate an alarm signal and to perform counter measures long before the battery will fail due to an insufficient capacity.

Preferably, the fore-mentioned solid-state devices, components and sensors are integrated into one unit, for example based on ASIC technique. The resulting ASIC device, the battery and the transmitting antenna are assembled into one incapsulated module. Said module is fastened on the valve spud at a valve spud side remote to the valve stem. In said position, the sensors are in a flow connection with the pressurized fluid within the tire.

Instead of a battery, other power supply means may be provided, for example, a piezoresisiv transducer, which uses the flexing work of the tire material in order to generate electric current or an inductive or capacitive input of electric power.

The present invention intends an improvement and a further development of a valve having means for generating a wireless transmittable indicating signal in case of a pressure drop within vehicle tires. A valve of said kind is known from German Patent No. 39 30 479. With respect to further details of said valve, reference is made to the disclosure of said document. This expressive reference shall include the content of said document—as far as necessary or helpful for the understanding of the present invention—to the present specification.

In the following, the present invention will be explained in more detail by reference to the following description of an embodiment of the invention in conjunction with an accompanied drawing showing a schematic section view of a valve according to the present invention.

The valve 1 as shown in the drawing is intended for the rim of a passenger car and comprises a conventional valve means and a signal generating means formed according to the present invention. The valve 1 comprises a valve stem 2 defining a valve bore 3 and terminating in a valve spud 15. A conventional valve means 4 (see for example German standard DIN 7757) is arranged within said valve bore 3. Said valve means 4 comprises a first sealing means 5, a second sealing means 6, a valve body 7, a spring 8 and a valve push rod 9. The first sealing means 5 is engaging pressure-tight the inner circumference of the valve bore 3. The second sealing means 6 forms a valve seat for the valve body 7, which is biased by the spring 8 towards the valve seat 6 and–thus closing pressure-tightly the valve 1 and an air tire equipped with said valve. By means of the valve push rod 9, the valve body 7 may be shifted off—against the spring 8 biasing—from the valve seat 6, such that pressurized fluid may flow through the valve bore 3, for example in order to perform an inflation step. Said valve 1 consisting of metal, for example aluminum or brass, being inserted into the bore of a drumstick-like gum body 12 having an enlarged section at the outer circumference and a circumferential groove 13 cut into said enlarged section. Said groove 13 may be inserted with an elastic deformation of the gum body 12 into a—non shown—valve opening at the rim of the wheel of a vehicle. In the present case, the valve 1 being intended for a tube-less tire. A modified and adapted embodiment of a valve according to the present invention may be used with tube tires.

In so far, the above described valve construction is of conventional design. The present invention provides for at least two modifications of said conventional valve design. First, the valve push rod 9 moving the valve body 7 and comprising conventionally a spring seat for the spring 8 is substantially elongated by the rod 10 comprising the spring seat 11. Said rod 10 extends beyond the spring seat 11 and comprises a permanent magnet 18 at the free end section. Whenever the valve means 4 is closed, said permanent magnet 18 is arranged in a certain distance to a magnetically controlled transistor 25 of the signal generating means 20. Whenever the valve push rod 9 is pushed down, the rod 10 is moved respectively, and the permanent magnet 18 will approach towards said magnetically controlled transistor 25.

Second, a cylinder-like sleeve 16 is formed in a one-piece manner at the valve spud 15 on the remote side to the valve stem 2. Said sleeve 16 comprises several radially aligned bores 17 providing a flow connection between the valve bore 3 and an inner space of the tire. Further, the sleeve 16 comprises a stepped inner circumference, and a module comprising the signal generating means 20 being inserted in the thus provided step.

The signal generating means 20 comprises several components which are depicted only in schematic manner. These components include a board 21 comprising a chip 22 having integrated devices such as an absolute-pressure sensor 23, an acceleration sensor 24, a magnetically controlled transistor 25 and a microprocessor 26, which includes an analog to digital converter 27 and an electric storage means 28. A battery 29 is arranged adjacent to said board 21; for example, a suited battery 29 is a lithium battery providing a capacity of about 40 milli Ampere hours. A transmitter means 30 including transmitting antenna 31 being arranged adjacent to said battery 29. All said stated components being sealed within a casting resin thus forming a module 32. As depicted, said module 32 comprises a projection at the outer circumference thereof, and said projection is enabled to snap in a circumferential groove formed at the inner circumference of the sleeve 16. Alternatively, there are other means of fastening the module 32 with the sleeve 16, for example, a fastening by means of—non shown—screws or other fastening means.

In a practically realized embodiment of a valve according to the present invention, a module being fastened to the valve spud of a valve being intended to the rim of a passenger car. Said module comprises a diameter of about 20 mm and an axial length of about 10 to 12 mm. The module weight amounts only about 10 g. Thus, an additional fastening of said signal generating means to a valve does not provide a significant imbalance.

What is claimed is:

1. A valve having signal generating means for generating a wireless transmittable indicating signal in response to a pressure drop within a vehicle tire, wherein the valve comprises a valve spud and a valve stem extending from said valve spud which provides a valve means which opens and closes during pressurization of said tire, said signal generating means mounted adjacent said valve spud comprising at least:

an absolute-pressure sensor being coupled to the pressure within the tire and generating an electric pressure signal in accordance with the pressure within the tire;

an electronic storage means;

a transmitter means for telemetric transmission of an indicating signal in case of a pressure drop;

a microprocessor including an arithmetic-logic unit; and an activating means coupled to said valve means for enabling the absolute-pressure sensor to generate an electric pressure signal corresponding to the actually prevailing tire pressure in response to operation of said valve means;

said electric pressure signal being stored into the electronic storage means after each operation of said valve means and is available as a reference pressure signal;

and wherein the arithmetic-logic unit:

compares an electric pressure signal generated by said absolute-pressure means with said stored reference pressure signal and generates a compare signal;

refers said compare signal to a given threshold value; and activates said transmitter means at least then, whenever a given ratio between the threshold value and the compare signal is outside upper and lower limits.

2. The valve according to claim 1, wherein said signal generating means further comprises an acceleration sensor.

3. The valve according to claim 1, wherein said absolute-pressure sensor is maintained in a deactivated status, and senses a tire pressure to generate an electric pressure signal only on a selective activation.

4. The valve according to claim 2, wherein a periodical activation of the absolute-pressure sensor is effected when the acceleration sensor has sensed a rotation of said tire.

5. The valve according to claim 1, wherein said absolute-pressure sensor comprises a piezoresistive transducer or a capacitive bridge circuit.

6. The valve according to claim 1, wherein said signal generating means additionally comprises an analog to digital converter, which transforms the analog pressure signals into digital signals.

7. The valve according to claim 1, wherein said electronic storage means comprises a digital storage means enabled to store at least an 8-bit word.

8. The valve according to claim 7, wherein said electronic storage means comprises a RAM (random access memory) requiring a continuous power demand less than 1 micro Ampere.

9. The valve according to claim 7, wherein said electronic storage means comprises an EEPROM (electrically erasable programmable read only memory).

10. The valve according to claim 1, said valve means includes a movable valve body biased by a spring into a valve seat in order to close the valve and further including a valve push rod enabled to move the valve body against the spring and away from the valve seat in order to change the tire pressure, wherein said activating means comprises a permanent magnet mechanically coupled with the valve push rod and following the movement thereof; said signal generating means comprises a magnetic field sensor sensing an approach of said permanent magnet; and said microprocessor generates and stores said selected electric pressure signal whenever the magnetic field sensor (25) has sensed an opening and renewed closing of the valve means.

11. The valve according to claim 10, wherein said magnetic field sensor comprises a magnetically controlled transistor.

12. The valve according to claim 1, wherein said electronic storage means contains a given pressure value corresponding to a desired pressure of a given vehicle tire; said selected pressure signal being generated whenever the activating means has been activated, and said pressure signal is compared with said desired pressure value generating an alarm signal whenever said selected pressure signal differs substantially from said desired pressure value.

13. The value according to claim 1, wherein said signal generating means comprises additionally a temperature sensor for sensing the temperature of the tire material and/or of the pressurized fluid within the tire.

14. The value according to claim 1, wherein said signal generating means comprises additionally a clock generator providing a clock frequency for a periodical activation of the microprocessor.

15. The valve according to claim 1, wherein said signal generating means additionally comprises a voltage control means for a power supply means which provides an operating voltage.

\* \* \* \* \*